United States Patent [19]

Wessner

[11] Patent Number: 5,048,461
[45] Date of Patent: Sep. 17, 1991

[54] BIRD FEEDER APPARATUS

[76] Inventor: John E. Wessner, 354 Peck St., Melbourne, Fla. 32901

[21] Appl. No.: 559,671

[22] Filed: Jul. 23, 1990

[51] Int. Cl.⁵ .................... A01K 39/00; A01K 39/022
[52] U.S. Cl. .................................. 119/52.3; 119/57.9
[58] Field of Search .................... 119/52.2, 52.3, 52.4, 119/57.8, 57.9, 55

[56] References Cited

U.S. PATENT DOCUMENTS

| | | | |
|---|---|---|---|
| 2,230,058 | 1/1941 | Hornung | 119/52.3 |
| 2,931,336 | 4/1960 | Cather | 119/52.3 |
| 3,104,649 | 9/1963 | Slaven | 119/52.3 |
| 3,124,103 | 3/1964 | Stainbrook | 119/52.3 |
| 3,164,130 | 1/1965 | Curtis | 119/57.9 |
| 3,241,525 | 3/1966 | Meier | 119/52.3 |
| 4,541,362 | 9/1985 | Dehls | 119/57.9 |

Primary Examiner—John G. Weiss
Attorney, Agent, or Firm—Leon Gilden

[57] ABSTRACT

A feeder apparatus wherein a counter-balanced perch is pivotally mounted adjacent a forward and rear face of the feeder structure, wherein the forward and rear face are mirror images relative to one another. The perch is pivotally mounted to trunnions orthogonally secured to side walls of the structure, with a counter-balance mounted thereon to permit adjustment of the feeder to accommodate and actuate to various classes of weighted birds mounting the perch. Upon a relatively large bird exceeding the support capacity of the perch alighting on the perch, the perch pivots downwardly and slidably draws a slide plate downwardly to prevent access of contents within the structure for feeding by the bird to discourage that category of bird from consuming feed within the organization.

1 Claim, 3 Drawing Sheets

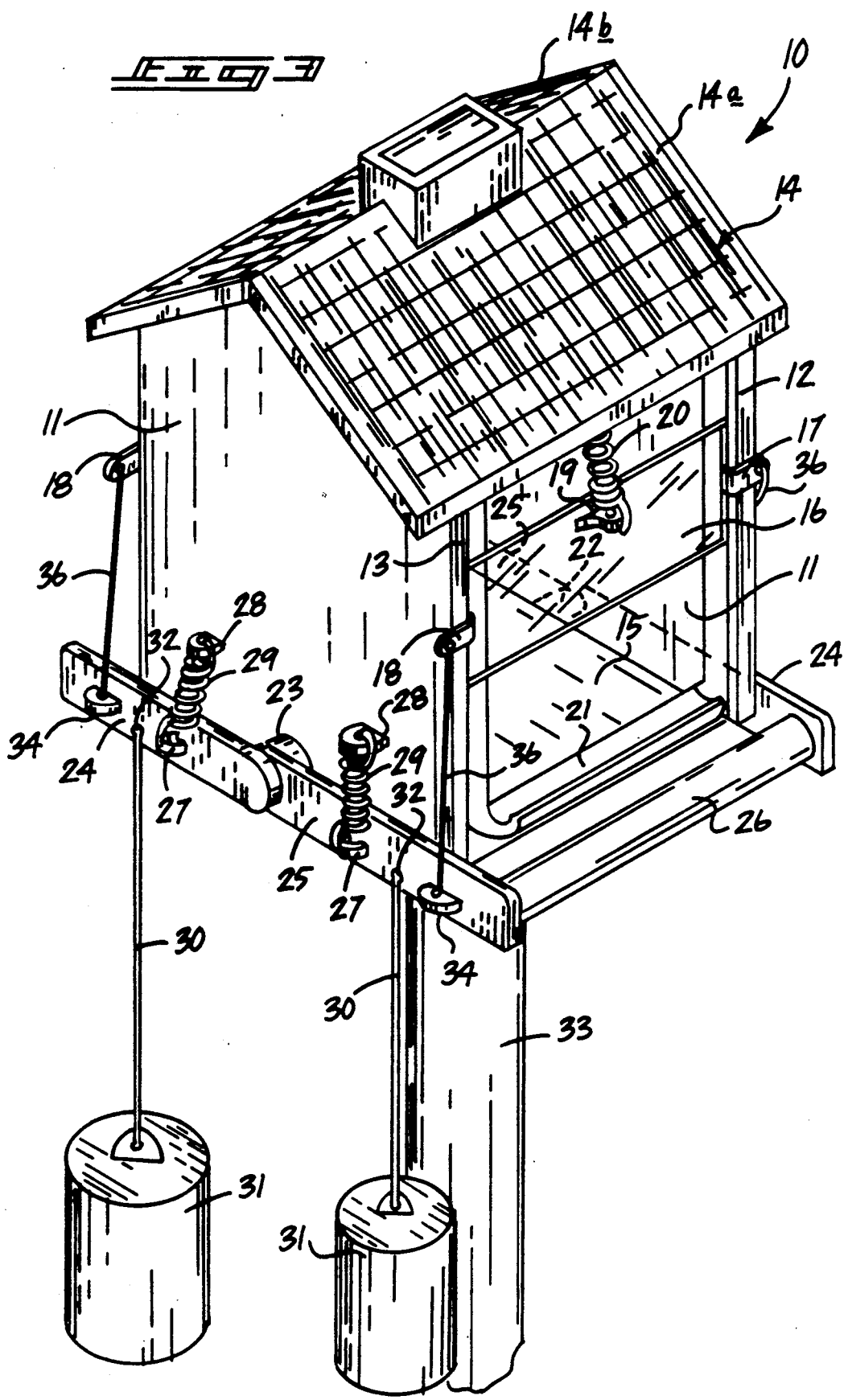

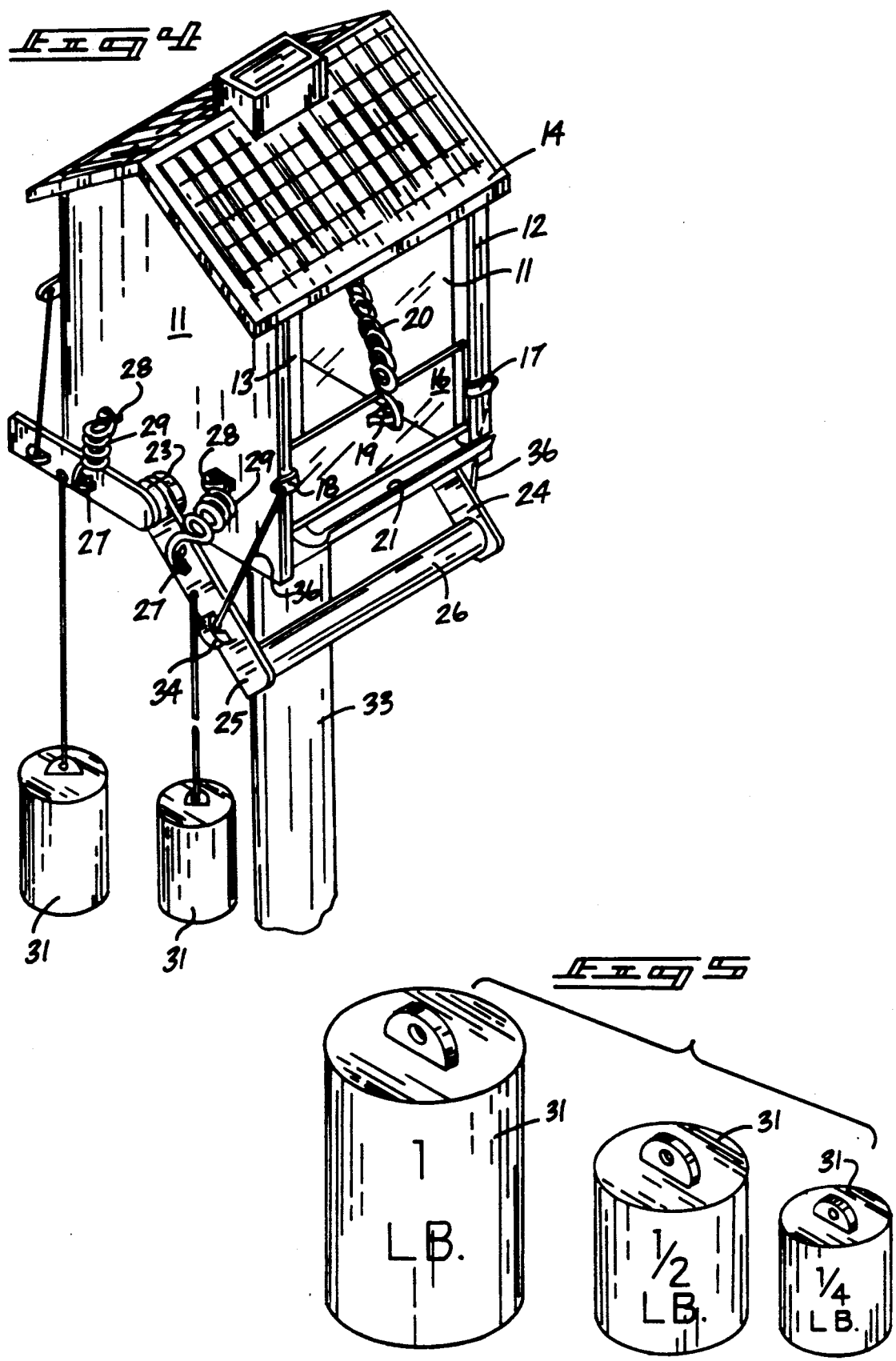

BIRD FEEDER APPARATUS

BACKGROUND OF THE INVENTION

1. Field of the Invention

The field of invention relates to feeder apparatus, and more particularly pertains to a new and improved bird feeder apparatus wherein the same is arranged to permit selective elimination of various classes of birds from attaining access to food within the feeder organization.

2. Description of the Prior Art

Weight responsive feeder structure has been utilized in the prior art to minimize access to food within a feeder structure to relative large birds that typically monopolize food within a particular source, such as the bird feeder, and prevent smaller birds from obtaining nourishment. The instant organization attempts to overcome deficiencies of the prior art by providing a simplified yet compact and effective organization that permits selective adjustment of the structure to eliminate various categories of birds depending upon geographical and seasonal requirements. Examples of prior art structure include U.S. Pat. No. 4,649,865 to Riggi wherein a perch is mounted to an overhang roof structure, whereupon a bird or animal above a desired weight mounting the perch, the perch is pivotally directed downwardly to prevent access to the food within the organization.

U.S. Pat. No. 4,867,104 to Vandiver sets forth a bird feeder wherein rotary members are mounted about the base of the structure to rotate and prevent a squirrel and the like from obtaining a grip about the feeder structure and thereby discouraging such animals from access to the feeder.

U.S. Pat. Reissue No. 32,970 to Furlani sets forth a bird feeder apparatus wherein an outer sleeve mounted relative to an inner feeder is directed downwardly against bias of a coaxial spring to displace openings of the inner sleeve and central member to prevent access of the larger birds to food within the feeder.

U.S. Pat. No. 4,846,111 to Kilham sets forth a bendable coil wire perch that is deflected upon a larger bird mounting thereon to prevent a larger bird from obtaining a grip relative to the housing.

As such, it may be appreciated that there continues to be a need for a new and improved bird feeder apparatus which addresses both the problems of ease of use as well as effectiveness in construction and in this respect, the present invention substantially fulfills this need.

SUMMARY OF THE INVENTION

In view of the foregoing disadvantages inherent in the known types of bird feeder apparatus now present in the prior art, the present invention provides a bird feeder apparatus wherein the same utilizes a sliding door mounted relative to the construction to prevent access of a larger category of bird from obtaining access to food within the housing structure of the organization. As such, the general purpose of the present invention, which will be described subsequently in greater detail, is to provide a new and improved bird feeder apparatus which has all the advantages of the prior art bird feeder apparatus and none of the disadvantages.

To attain this, the present invention provides a feeder apparatus wherein a counter-balanced perch is pivotally mounted adjacent a forward and rear face of the feeder structure, wherein the forward and rear face are mirror images relative to one another. The perch is pivotally mounted to trunnions orthogonally secured to side walls of the structure, with a counter-balance mounted thereon to permit adjustment of the feeder to accommodate and actuate to various classes of weighted birds mounting the perch. Upon a relatively large bird exceeding the support capacity of the perch alighting on the perch, the perch pivots downwardly and slidably draws a slide plate downwardly to prevent access of contents within the structure for feeding by the bird to discourage that category of bird from consuming feed within the organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bird feeder apparatus which has all the advantages of the prior art bird feeder apparatus and none of the disadvantages.

It is another object of the present invention to provide a new and improved bird feeder apparatus which may be easily and efficiently manufactured and marketed.

It is a further object of the present invention to provide a new and improved bird feeder apparatus which is of a durable and reliable construction.

An even further object of the present invention is to provide a new and improved bird feeder apparatus which is susceptible of a low cost of manufacture with regard to both materials and labor, and which accordingly is then susceptible of low prices of sale to the consuming public, thereby making such bird feeder apparatus economically available to the buying public.

Still yet another object of the present invention is to provide a new and improved bird feeder apparatus which provides in the apparatuses and methods of the prior art some of the advantages thereof, while simultaneously overcoming some of the disadvantages normally associated therewith.

Still another object of the present invention is to provide a new and improved bird feeder apparatus wherein the same provides an adjustably related perch structure that is selectively adjusted for various catergories of birds depending upon seasonal and geographical requirements.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an isometric illustration of the instant invention with the perch in a displaced orientation.

FIG. 5 is an isometric illustration of a plurality of weights utilized by the instant invention in association with the bird feeder apparatus to provide selective counter-balancing of perch structure.

DESCRIPTION OF THE PREFERRED EMBODIMENT

Figure 1:
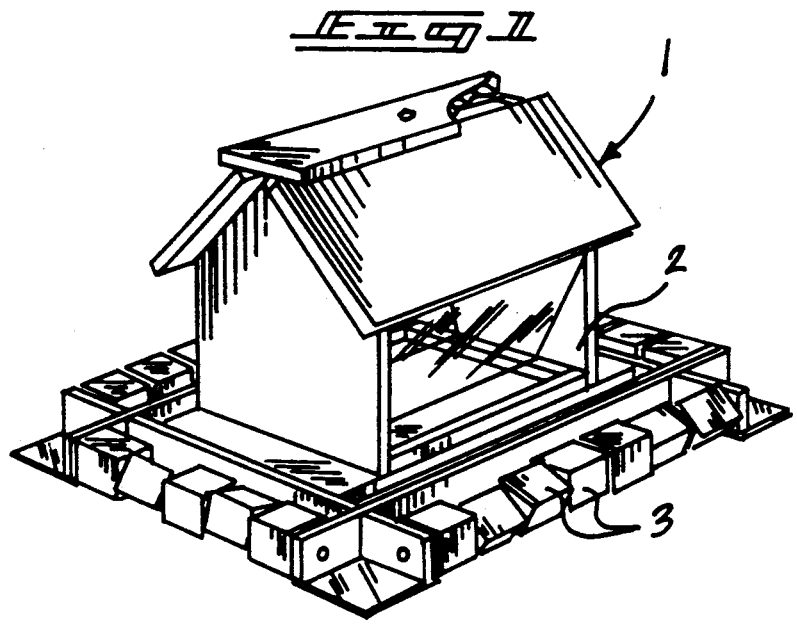
FIG. 1 is an isometric illustration of a prior art bird feeder apparatus.

With reference now to the drawings, and in particular to FIGS. 1 to 5 thereof, a new and improved bird feeder apparatus embodying the principles and concepts of the present invention and generally designated by the reference numeral 10 will be described.

Figure 2:
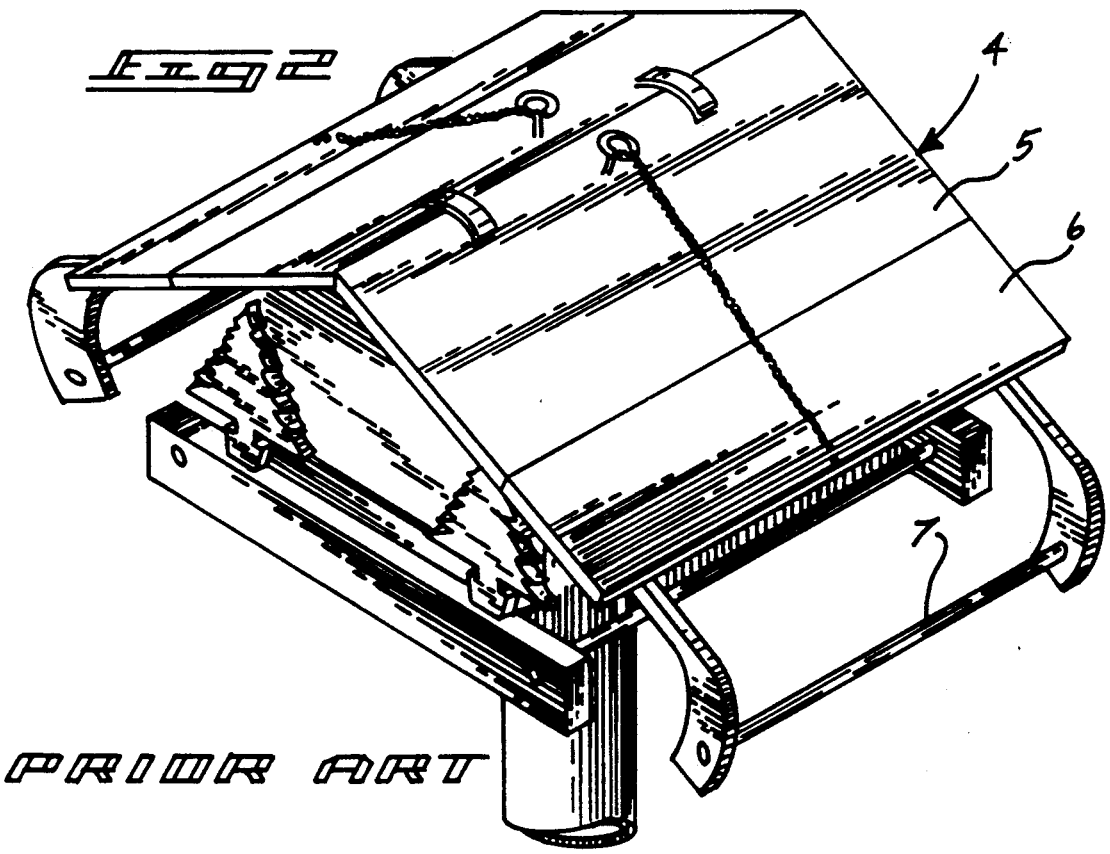
FIG. 2 is an isometric illustration of a further prior art bird feeder apparatus.

FIG. 1 illustrates a prior art bird feeder apparatus 1, wherein the bird feeder structure 2 is surrounded by a series of roller elements 3 that are rotatable upon a larger animal or a squirrel mounting the roller elements to prevent grasping of the roller elements and discouraging such animals from access to the bird feeder. FIG. 2 illustrates a further prior art bird feeder apparatus 4 wherein a roof structure 5 utilizes a forward pivotal roof structure 6 pivotally mounted to the roof structure 5 that is displaced outwardly upon a perch 7 being displaced outwardly to effect rotation of the perch 7 and roof extension 6 relative to the bird feeder structure.

More specifically, the bird feeder apparatus 10 of the instant invention essentially comprises an enclosure defined by spaced parallel side walls 11 orthogonally and integrally mounted to a floor 15, wherein the floor 15 is coextensively mounted to the lower end portions of the side walls 11. A roof plate 14 extends overlying the upper end portions of the side walls, as illustrated, with an overhang directed thereover to afford protection from various climate conditions such as rain, snow, and the like. Each end of the side walls 11 include a respective right and left end rail flange 12 and 13 extending orthogonally relative to end edges of the side walls 11 in an orientation to project towards one another, in a manner as illustrated in FIG. 3. It should be noted that the structure, as illustrated in FIG. 3, defines a mirror image about a plane directed medially of the side walls and orthogonally therethrough, wherein description of the structure underlying the roof segment 14a is equal to a mirror image relationship to the further roof segment 14b and divided relative to one another by the aforenoted plane. The roof 14a extends overlying the floor 15 to be positioned above a trough 21 that is coextensive with a forward end of the floor 15 to capture various bird feed within the floor 15 for consumption by a bird mounted on the associated perch rod 26. A slide plate 16 that is coextensively mounted between the right and left rail flanges 12 and 13 is integrally secured to respective right and left "U" shaped clips 17 and 18 respectively that is fixedly mounted to each end of the slide plate 16 and about each respective right and left rail flange 12 and 13 to effect a vertical sliding relationship of the sliding plate 16 relative to the rail flanges, in a manner that is depicted between FIGS. 3 and 4. A flange plate 19 mounted to a forward face of the slide plate 16 cooperates with and secures a lower terminal end of a first retention spring 20 whose upper terminal end is mounted to the roof portion 14a to effect retraction of the slide plate in a raised orientation, as illustrated in FIG. 3. Right and left trunnion mounts 22 and 23 are mounted medially at a lower terminal edge of the respective side walls 11 and include securement of a respective left and right support leg 24 and 25. The left and right support legs 24 and 25 are mounted at their rear terminal ends pivotally to the respective right and left trunnion mounts and orthogonally and integrally capture the perch rod 26 therebetween to define a generally "U" shaped organization. Each support leg includes a first leg clip 27 that cooperates and retains a lower terminal end of a second retraction spring 29, with a side wall clip 28 mounted to the each side wall spaced above and in alignment with the first support clip 27 which retains the upper terminal end of each second retraction spring 29 to normally bias the perch rod 26 in an aligned relationship relative to the floor 15. A tether line 30, whose upper terminal end is secured to the left support leg 25 forwardly of the first leg support clip 27, extends downwardly from a tether mounting aperture 32 and secures a counter-balance weight 31 at a lower terminal end thereof. The counter-balance weight 31 is one of a group of counter-balance weights that are replaceably mounted onto the lower terminal end of the tether line 32 to effect counter balancing of the first and second retraction springs 20 and 29 and by varying of the counter-balance weight 31, the perch rod 26 will pivot downwardly, in a manner as illustrated in FIG. 4. It is understood that the greater the weight of counter-balance weights that are utilized, the smaller or lighter birds only will be accommodated by the perch rod 26 prior to its downward pivotment which simultaneously directs the slide plate 16 downwardly to block access to the contents of the structure that is deposited about the floor 15. This effect is operative by a slide plate cable 36 at its upper terminal end and is secured to each respective right and left "U" shaped clip 17 and 18 and whose lower terminal end is secured to a cable flange 34 mounted to an exterior surface of each respective right and left support leg 24 and 25 in alignment with each respective right and left "U" shaped clip 17 and 18 when the perch rod 26 is in a raised first position. A support post 23 is mounted orthogonally to a bottom surface of the floor 15 to position and space the feed structure above a ground surface level to limit access to birds and space the counter-balance weights 31 above a ground surface level.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bird feeding apparatus comprising, in combination, a feed structure provided with at least one opening, the feed structure including spaced parallel side walls arranged coextensively relative to one another and including a floor mounted orthogonally relative to and between the side walls, and a roof mounted to the side walls to overlie the floor, and the side walls including aligned side edges, and a slide plate mounted reciprocatably and slidably along the side edges, and the slid plate biased to a first raised position spaced above the floor and the slide plate repositionable to a second lowered position in contact with the floor, and a perch rod means pivotally mounted relative to the feed structure from a first position in alignment with the floor to a second position spaced below the floor wherein the perch rod means is operatively associated with the slide plate to effect repositioning of the slide plate to the second position when the perch rod means is rotated to a second perch rod position, and wherein the opening includes a respective right and left rail flange mounted to each aligned side edge of each side wall, wherein the right and left rail flanges are arranged orthogonally relative to each respective side wall, and the slide plate includes a respective right and left "U" shaped clip mounted to each respective right and left end of the slide plate, wherein each right and left clip is slidably mounted to each respective right and left rail flange, and wherein the perch rod means includes a right and left leg, each right and left leg orthogonally and integrally mounted to each opposed end of the perch rod means and extending parallel to each respective side wall of the feed structure, and each right and left leg pivotally mounted relative to the feed structure, and each leg including a cable flange integrally mounted to an exterior surface of each leg, and each cable flange includes a slide plate cable secured at a lower terminal end of each slide plate cable to a respective cable flange of a respective right and left leg, with an upper terminal end of each slide plate cable mounted to a respective right and left "U" shaped clip, and wherein the slide plate includes a flange plate mounted to an exterior surface of the slide plate, and the flange plate retaining a lower terminal end of a first retraction spring, and an upper terminal end of the first retraction spring mounted to the roof, and including a support clip mounted to each right and left leg, and a side wall clip mounted to each side wall in alignment above each support clip when the perch rod means is in the first position, and a second retraction spring secured between the side wall clip and the support clip to bias the perch rod means in the first position, and including a tether line, the tether line mounted to one of the right and left legs at an upper terminal end of the tether line, and a lower end of the tether line selectively secured to one of a plurality of counter-balance weights, and including a concave trough mounted to the floor between the perch rod means and a forward terminal end of the floor.

* * * * *